(12) United States Patent
Cheng (10) Patent No.: US 10,016,043 B1
(45) Date of Patent: Jul. 10, 2018

(54) DETACHABLE BEAUTY GEL CURING DEVICE

(71) Applicant: Kuo Chang Cheng, Taoyuan (TW)

(72) Inventor: Kuo Chang Cheng, Taoyuan (TW)

(*) Notice: Subject to any disclaimer, the term of this patent is extended or adjusted under 35 U.S.C. 154(b) by 0 days.

(21) Appl. No.: 15/801,327

(22) Filed: Nov. 2, 2017

(51) Int. Cl.
*A45D 29/00* (2006.01)
*B01J 19/12* (2006.01)
*F26B 3/28* (2006.01)

(52) U.S. Cl.
CPC ............ *A45D 29/00* (2013.01); *B01J 19/123* (2013.01); *A45D 2200/205* (2013.01); *B01J 2219/0877* (2013.01); *F26B 3/28* (2013.01)

(58) Field of Classification Search
CPC . A45D 29/00; A45D 2200/205; B01J 19/123; B01J 2219/0877; F26B 3/28
USPC ................ 250/453.11–455.11, 504 R, 504 H
See application file for complete search history.

(56) References Cited

U.S. PATENT DOCUMENTS

2012/0060757 A1* 3/2012 Li ............................ F26B 3/28
118/620

* cited by examiner

*Primary Examiner* — Michael Maskell
(74) *Attorney, Agent, or Firm* — Idea Intellectual Limited; Margaret A. Burke; Sam T. Yip (57) ABSTRACT

A beauty gel curing device includes a bottom seat and a main body detachably mounted on the bottom seat. The bottom seat includes a base frame having walls and an opening; a UV LED module having UV LED lamps; a top cover fixed on the base frame to form the main body. A control module is provided on the main body. A grip portion is disposed at a side of the main body. A battery unit is disposed in the main body. A charging port is disposed at a side of the bottom seat. The bottom seat and the main body are electrically connected and the battery unit in the main body is charged through the charging port.

11 Claims, 6 Drawing Sheets

DETACHABLE BEAUTY GEL CURING DEVICE

FIELD OF INVENTION

The present invention generally relates to a light curing device, and more particular to a beauty gel curing device using an Ultraviolet Light Emitting Diode (UV LED) to cure the gel nail polish coated on the users' fingernails and toenails.

BACKGROUND

In the field of nail art, the use of UV light to treat the UV gel polish coated on the fingernails or toenails is a well known method. A UV curing device for fingernails or toenails available in the market is configured to have an inverse U-shaped case and the fingers are put in the notches of the case for treatment by the UV light. The curing device can also be rotated 180 degrees and held by hand to allow the UV light to radiate on the toenails. The disadvantage of the conventional UV curing devices is that while the toenails are treated by the UV light, the user has to hold the entire curing device. Thus, it is quite inconvenient to use the curing device.

Another conventional curing device for fingernails and toenails includes a case and a light source of UV LED received in the case. The case has an opening at one end thereof, so that the user's fingers or toes can be inserted therein for treatment by the UV light. While in use, the user usually places the device at an edge of a table and raises his feet on the table. After a period of time, the body will feel pain and fatigue.

SUMMARY OF INVENTION

Due to abovementioned drawbacks, a primary objective of the present invention is to provide a beauty gel curing device which includes a main body and a bottom seat detachable from each other, such that the user can grip the main body alone to directly apply the UV light on the gel polish coated on the toenails without raising the feet to the table. It would be easier to use the device.

In order to achieve the above-mentioned objective, the present invention provides a beauty gel curing device including: a bottom seat, a main body, a control module, a grip portion, a battery unit and a charging port. The main body is detachably mounted on the bottom seat. The main body includes a base frame having a plurality of walls and an opening, the walls and the opening defining a chamber; a plurality of ultraviolet light emitting diode (UV LED) modules, each having a plurality of UV LED lamps, wherein when the UV LED modules are activated, the UV LED lamps emits UV light beams into the chamber; and a top cover fixed on the base frame, the top cover and the base frame forming an external casing of the main body. The control module is provided on the main body for controlling activation of the UV LED modules. The grip portion is disposed at a side of the main body for holding the main body. The battery unit is disposed in the main body. The charging port is disposed at a side of the bottom seat and capable of connecting with an external power source. Wherein the bottom seat includes a pair of pins having positive and negative terminals while the main body includes a pair of pin insert holes corresponding to the pins, the main body is electrically connected with the bottom seat by the pins and the pin insert holes.

Distinct from the prior art, one of the advantages of the present invention resides in that the grip portion is disposed at a side of the main body. Thus, the user can easily hold the grip portion and detach the main body from the bottom seat. Another advantage reside in that the battery unit is disposed in the main body. After the battery unit is charged, the user can use the main body separately from the bottom seat without connecting the main body with an external charging wire. Moreover, the charging port is disposed at a side of the bottom seat. Therefore, after connecting with an external power line, the bottom seat and the battery can be charged at the same time. A USB port is provided at a side of the bottom seat. Thus, the USB port can connect with external devices having a USB connector.

According to the preferred embodiment of the present invention, the bottom of the main body includes a pair of engaging hooks and the bottom seat includes a pair of hook-reception recesses corresponding to the engaging hooks. The engaging hooks of the main body are engaged with the hook-reception recesses of the bottom seat, thereby detachably fixing the main body on the bottom seat.

According to the preferred embodiment of the present invention, a plurality of magnets are provided in the bottom seat and the main body includes a plurality of magnetic elements disposed at positions corresponding to the magnets. The main body is connected with the bottom seat by the attraction between the magnets and the magnetic elements, thereby detachably fixing the main body on the bottom seat.

According to the preferred embodiment of the present invention, a bottom of the main body includes a plurality of gasket pads and the bottom seat includes a plurality of pad retention recesses disposed at positions corresponding to the gasket pads. The gasket pads of the main body are engaged with the pad retention recesses of the bottom seat, thereby detachably fixing the main body on the bottom seat.

According to the preferred embodiment of the present invention, the control module includes a plurality of activating buttons, and the activating buttons are capable of activating different time setting modes, respectively.

According to the preferred embodiment of the present invention, the control module includes a display screen capable of displaying countdown seconds.

According to the preferred embodiment of the present invention, the bottom seat includes a universal serial bus (USB) port for electrically connecting an external device with the bottom seat.

According to the preferred embodiment of the present invention, the main body includes a power supply port capable of electrically connecting with an external device.

According to the preferred embodiment of the present invention, each UV LED module includes UV LED lamps to provide light in at least two different ranges of wavelengths.

According to the preferred embodiment of the present invention, a bottom of the main body includes at least one leg, the bottom seat includes at least one leg reception recess disposed at positions corresponding to the legs, the leg is capable of being switched between a collapsed position and a supporting position, the leg is laid flat on the bottom of the main body when the leg is in the collapsed position, the leg stands in the leg reception recess when the leg is in the supporting position, thereby raising one end of the main body upward to a position which has a distance from the bottom seat.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE INVENTION

The accompanying drawings are included to provide a further understanding of the invention, and are incorporated in and constitute a part of this specification. The drawings illustrate embodiments of the invention and, together with the description, serve to explain the principles of the invention.

Figure 1:
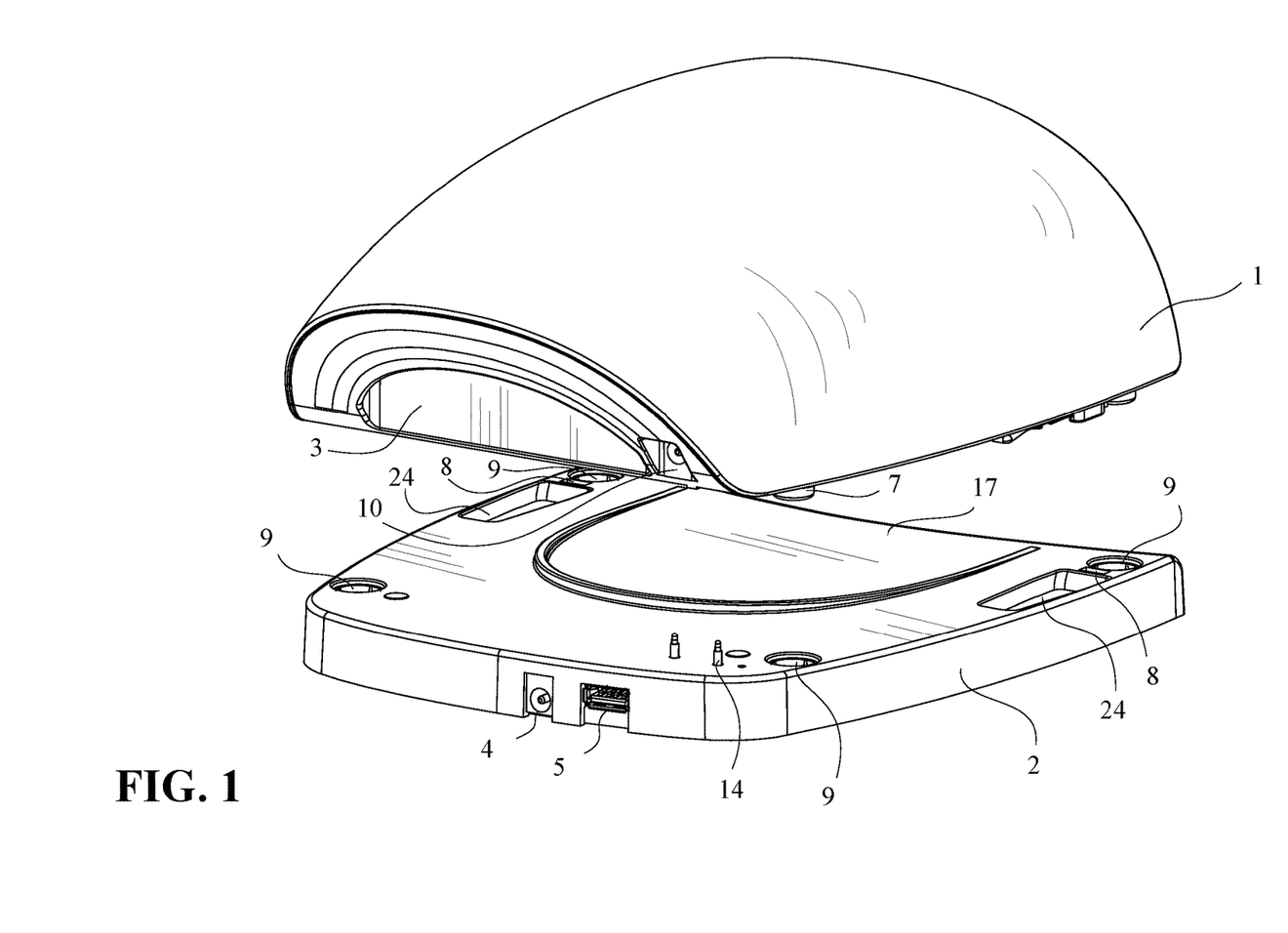
FIG. 1 is a perspective view showing a main body and a bottom seat in accordance with a preferred embodiment of the present invention.
Figure 2:
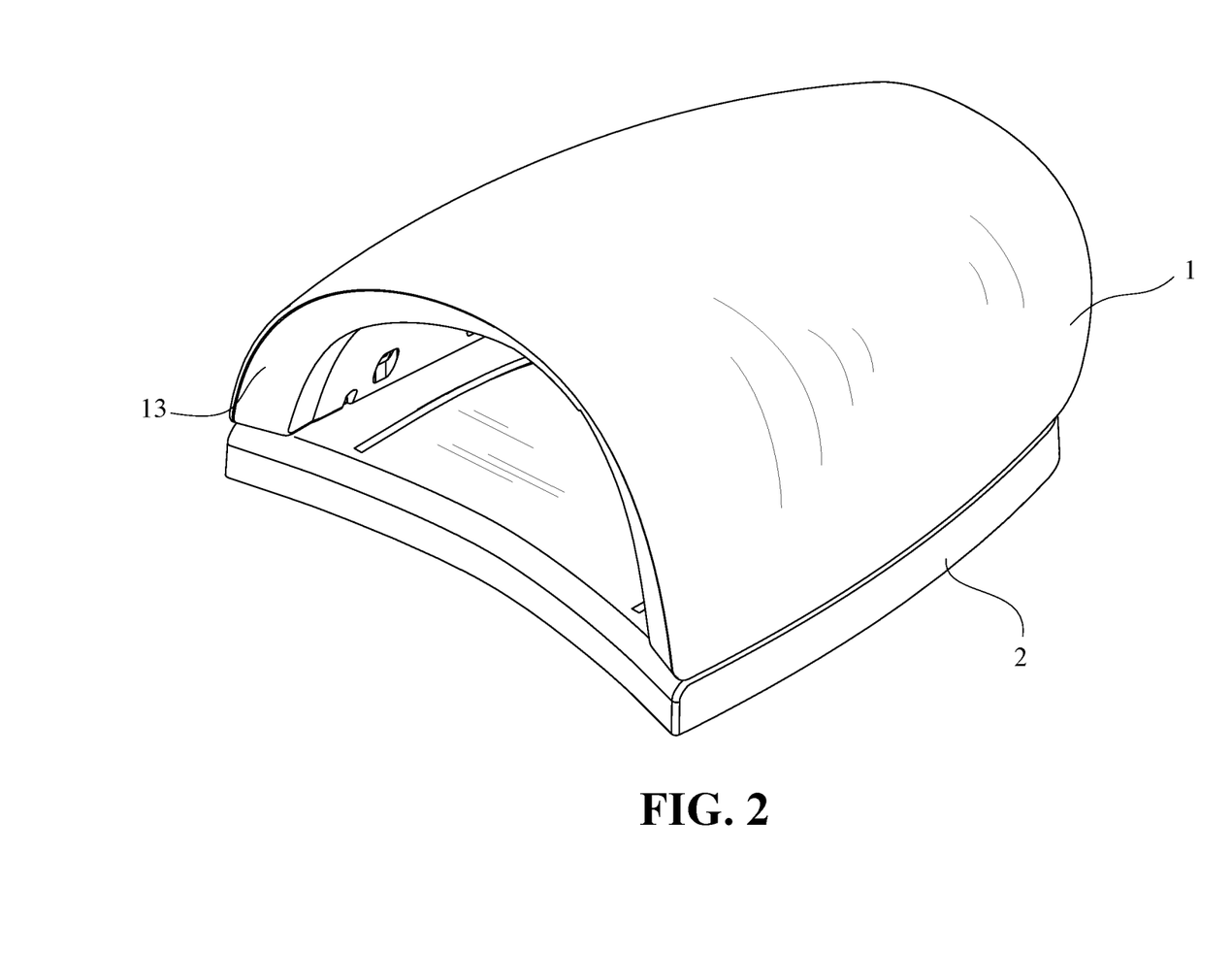
FIG. 2 is a perspective view showing a detachably beauty gel curing device in accordance with the preferred embodiment of the present invention.

FIG. 1 is a perspective view showing a main body and a bottom seat in accordance with a preferred embodiment of the present invention; and FIG. 2 is a perspective view showing a detachable beauty gel curing device in accordance with the preferred embodiment of the present invention. As illustrated in FIGS. 1 and 2, the detachable beauty gel curing device in accordance with the present invention includes: a main body 1 and a bottom seat 2. According to the preferred embodiment of the present invention, the main body 1 may be detachably mounted on the bottom seat 2 to be used and be charged. The main body 1 may also be detached from the bottom seat to be used through a grip portion 3 that is provided at a side of the main body 1. Detailed structures of the main body 1 and the bottom seat 2 would be described in the following paragraphs.

Figure 3:
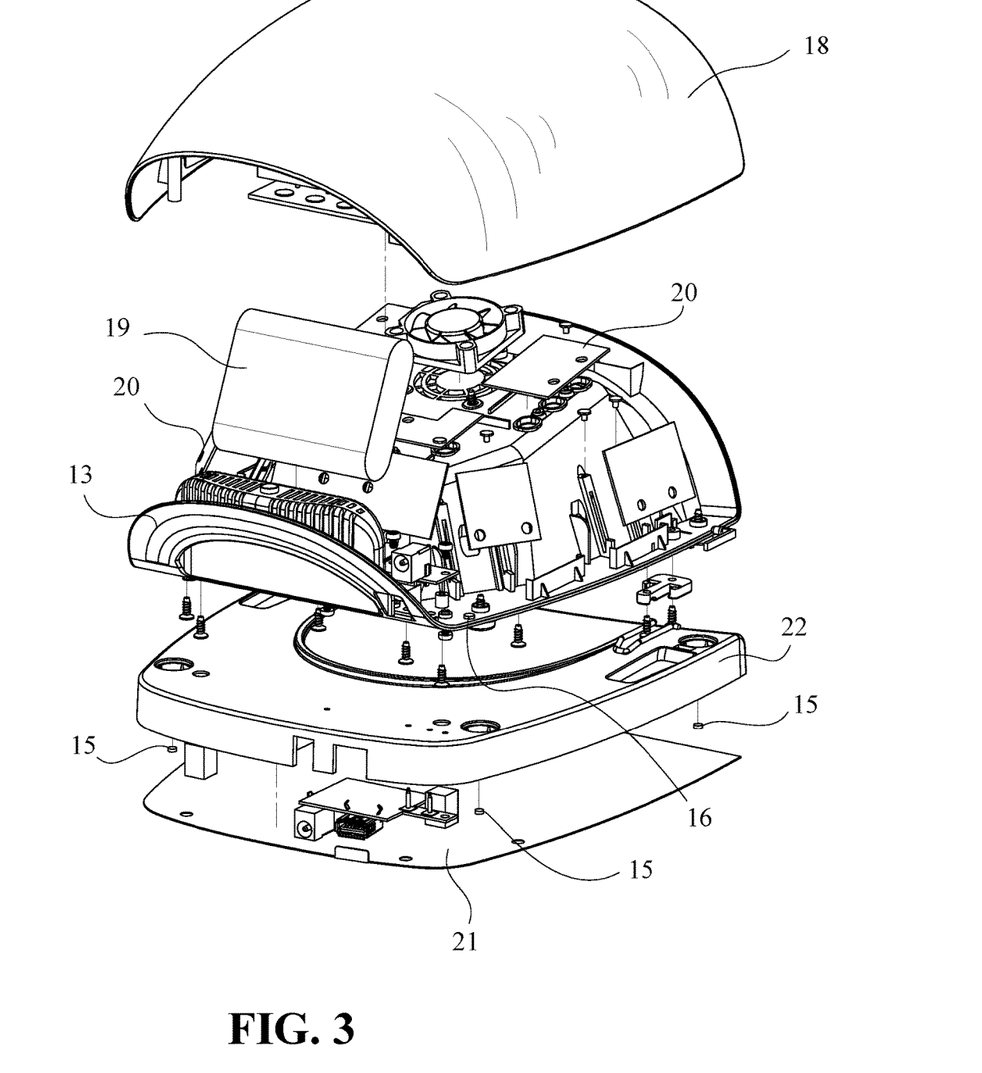
FIG. 3 is an exploded view showing the main body and the bottom seat of the detachable beauty gel curing device in accordance with the preferred embodiment of the present invention.

FIG. 3 is an exploded view showing the main body and the bottom seat of the detachable beauty gel curing device in accordance with the preferred embodiment of the present invention. Referring to FIGS. 1 to 3, the main body 1 includes a top cover 18 and a base frame 13. The top cover 18 has an arc shape and the base frame 13 has a shape corresponding to that of the top cover 18. As shown in FIG. 2, the base frame 13 includes a plurality of walls and an opening. The walls and the opening define a chamber. Moreover, the base frame 13 is provided with a battery unit 19 that can be repeatedly charged and a plurality of ultraviolet light emitting diode (UV LED) modules 20 as best shown in FIG. 3. According to the embodiment of the present invention, the rechargeable battery unit 19 may be a lithium battery for supplying electrical power to the UV LED modules 20 and other components of the beauty gel curing device. The battery unit 19 is recharged through the electric connection between the main body 1 and the bottom seat 2. The method of recharging will be described later. Each of the UV LED modules 20 includes a plurality of UV LED lamps, which is, upon activation, capable of emitting UV light into the chamber. Moreover, according to the preferred embodiment of the present invention, each of the UV LED modules 20 includes the UV LED lamps to provide light in at least two different ranges of wavelengths. Furthermore, according to the preferred embodiment of the present invention, the lens (not shown in drawings) of the UV LED lamps has the effect of light convergence, which enable the emitted UV light beams to converge to a spot. After the components are mounted on the base frame 13, the base frame 13 and the top cover 18 are connected to each other and therefore form an external casing of the main body 1 to accommodate the variety of electronic elements. Note that the top cover 18 and the base frame 13 are made of plastic material. However, the scope of the material should not be limited only thereto.

Referring to FIGS. 1-3, the main body 1 further includes a control module for controlling the activation of the UV LED modules 20. According to the preferred embodiment of the present invention, the control module includes a display screen 11 installed on the surface of the top cover 18 and a plurality of activation buttons 12. However, they may also be any components that can be used to activate the UV LED modules, such as a touch screen, switches, etc. The user can operate the detachable beauty gel curing device by the activation buttons 12. For example, when pressing one of the activation buttons 12, the UV LED modules are activated for a period of time corresponding to the pressed activation button 12 and the display screen 11 displays the countdown seconds for the activated period of time. A more detailed operation mode will be described later.

Referring to FIGS. 1 and 2, the bottom seat 2 is configured to have a shape corresponding to that of the main body 1, so that the main body 1 can be detachably mounted on the bottom seat 2. A rear side of the bottom seat 2 is provided with a charging port 4 and a universal serial bus (USB) port 5. The charging port 4 may be electrically connected with an external power source. More particularly, in addition to supplying power to the bottom seat 2, the charging port 4 may supply power to the components and the battery unit 19 in the main body 1 after the bottom seat 2 is electrically connected with the main body 1. The USB port 5 is a USB slot and may be connected with the external USB devices. The bottom seat 2 further includes a pair of pins 14 having positive and negative terminals and the pins 14 are disposed on a top surface of the bottom seat 2. The pins 14 are a pair of bar-shaped elements and may be electrically connected with pin insert holes (not shown) that are disposed at corresponding positions on the main body 1. In addition to by the pins 14 and the pin insert holes, the main body 1 and the bottom seat 2 may be further connected with each other by pad retention recesses 9 of the bottom seat 2 and gasket pads 7 of the main body 1 and by hook-reception recesses 8 of the bottom seat 2 and engaging hooks 6 of the main body 1. A connection method between the main body 1 and the bottom seat 2 would be further described in the following descriptions.

Referring to FIGS. 1-3, the bottom seat 2 includes a lower bottom seat 21 and an upper bottom seat 22. The lower bottom seat 21 and an upper bottom seat 22 have shapes corresponding to each other and connected with each other to form the bottom seat 2. A plurality of magnets 15 are provided on a lower side of the upper bottom seat 22 while the base frame 13 is provided with a plurality of magnetic elements 16 corresponding to the magnets 15. The main body 1 and the bottom seat 2 are further connected together by the magnetic force between the magnets 15 and the magnetic elements 16. According to the preferred embodiment of the present invention, the magnetic elements 16 may be any element that can be attracted by the magnets, such as iron units, screws, etc. However, the magnetic elements 16 are not limited to these types. Therefore, the main body 1 and the bottom seat 2 can be securely connected by the connection means mentioned above while the main body 1 can be easily taken away from the bottom seat 2.

Referring to FIGS. 1-2, the bottom seat 2 has a top surface formed with a digit positioning recess 17. To be more specific, an arc-shaped edge for defining the digit positioning recess 17 projects upward from the top surface of the bottom seat 2. Therefore, when the user's body parts are put in the detachable beauty gel curing device to undergo the curing process, the digits to be cured is positioned in the digit positioning recess 17.

Figure 4:
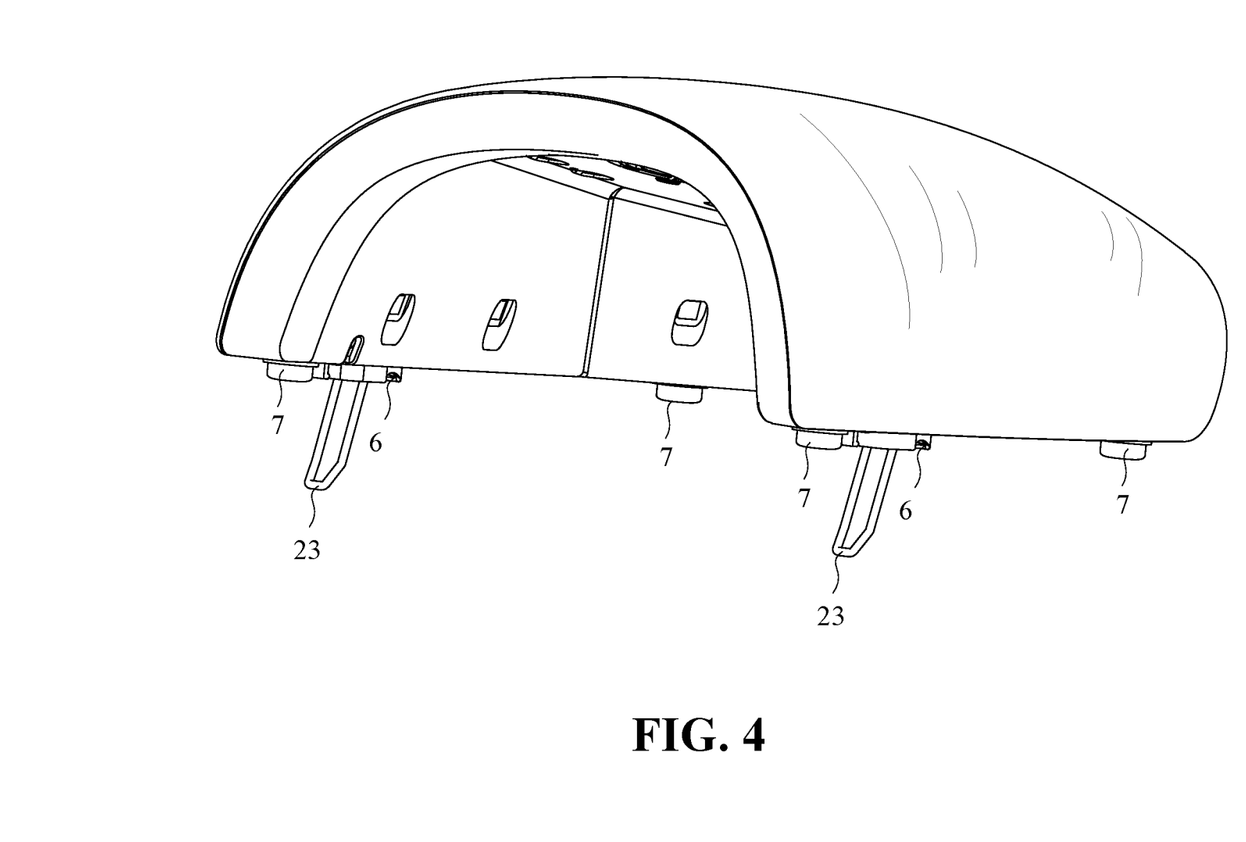
FIG. 4 is a perspective view of the main body of the detachable beauty gel curing device in accordance with the preferred embodiment of the present invention.

FIG. 4 is a perspective view showing the main body in accordance with the preferred embodiment of the present invention. Referring to FIGS. 1 and 4, a bottom of the main body 1 includes a plurality of gasket pads 7 and a pair of engaging hooks 6. The gasket pads 7 and the pad retention recesses 9 of the bottom seat 2 are corresponding structures, such that the gasket pads 7 of the main body 1 are engaged with the pad retention recesses 9 of the bottom seat 2 to further fix the main body 1 and the bottom seat 2 together. The engaging hooks 6 are engaged with the hook-reception recesses 8, so that the main body 1 does not wobble relative to the bottom seat 2. In order to further explain the detachable beauty gel curing device in accordance with the present invention in use, please refer to FIGS. 1 and 2. FIG. 2 shows the device in a state that the main body 1 and the bottom seat 2 are connected with each other. At the moment, when using the device according to the present invention, the user only needs to put the body parts, such as fingernails or toenails, to be irradiated into a space between the main body 1 and the bottom seat 2 and put them on the digit positioning recess 17, so that the body parts to be irradiated can obtain the optimal irradiation position. Then, activate the curing device and wait for time to count down. When the countdown is over, the UV curing process is finished.

Figure 6:
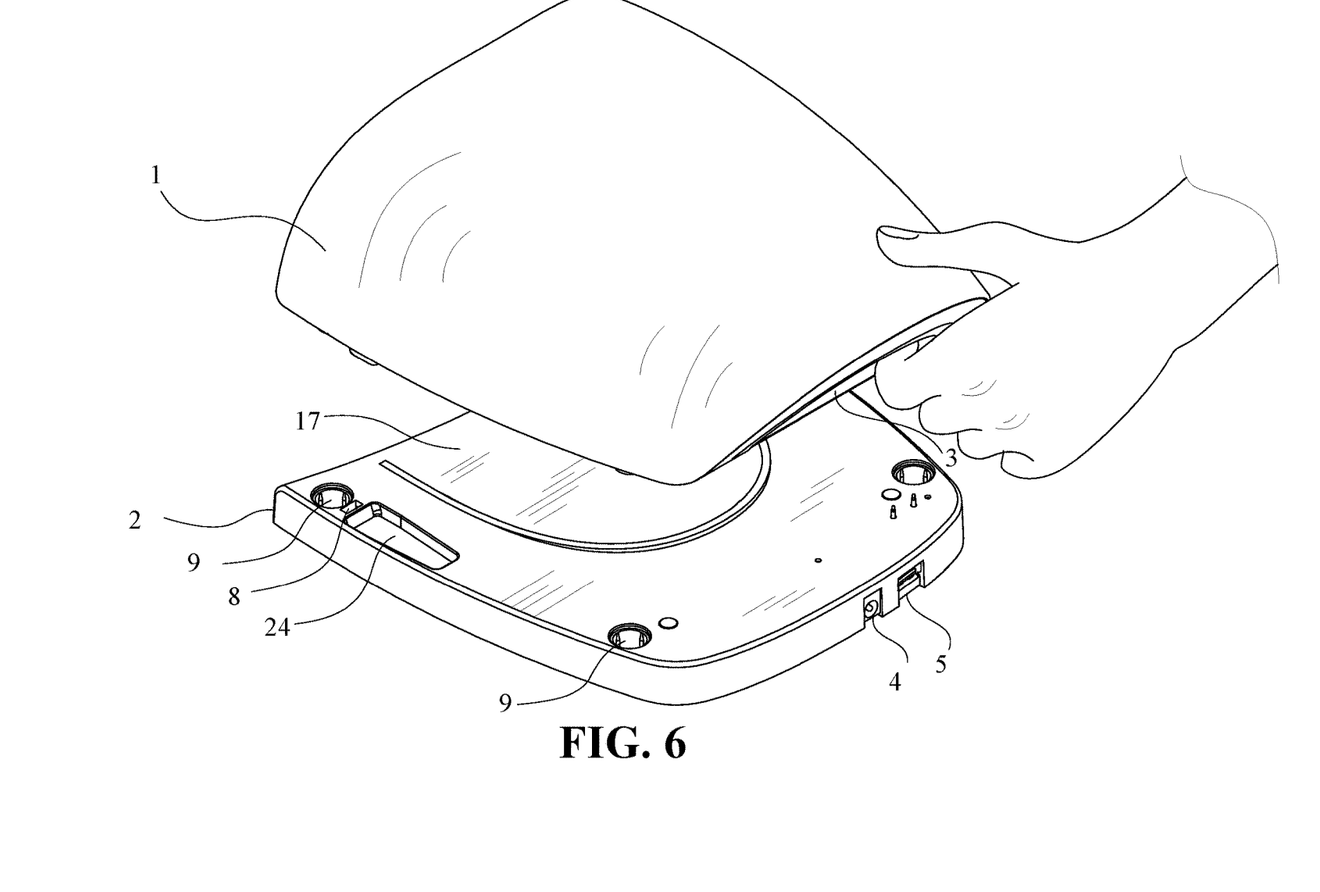
FIG. 6 is a schematic view illustrating the detachable beauty gel curing device in accordance with the preferred embodiment of the present invention in use.

Furthermore, the beauty gel curing device in accordance with the present invention is detachable. For further explanation, please refer to FIG. 6. FIG. 6 is a perspective view illustrating the detachable beauty gel curing device in accordance with the present invention in use. For the convenience of taking and holding the main body 1, the user can hold the main body 1 by griping the grip portion 3 in order to detach from the bottom seat 2.

The connection modes of the main body 1 and the bottom seat 2 would be given in the following description. According to the preferred embodiment of the present invention, there are three modes for connecting the main body 1 with the bottom seat 2. First of all, referring to FIGS. 1 and 2, the gasket pads 7 of the main body 1 and the pad retention recesses 9 of the bottom seat 2 have structures corresponding to each other. The main body 1 can be connected with the bottom seat 2 by engaging the gasket pads 7 of the main body 1 with the pad retention recesses 9 of the bottom seat 2 in an interfering manner. FIG. 2 shows the appearance of the connected main body 1 and bottom seat 2 after they are connected. Secondly, referring to FIGS. 1 and 4, the main body 1 includes the engaging hooks 6 to be fully engaged with the hook-reception recesses 8 of the bottom seat 2. At last, referring to FIGS. 1-3, the magnets 15 provided on the lower side of the upper bottom seat 22 and the magnetic elements 16 are connected by magnetic forces to further securely connect the main body 1 with the bottom seat 2.

Figure 5:
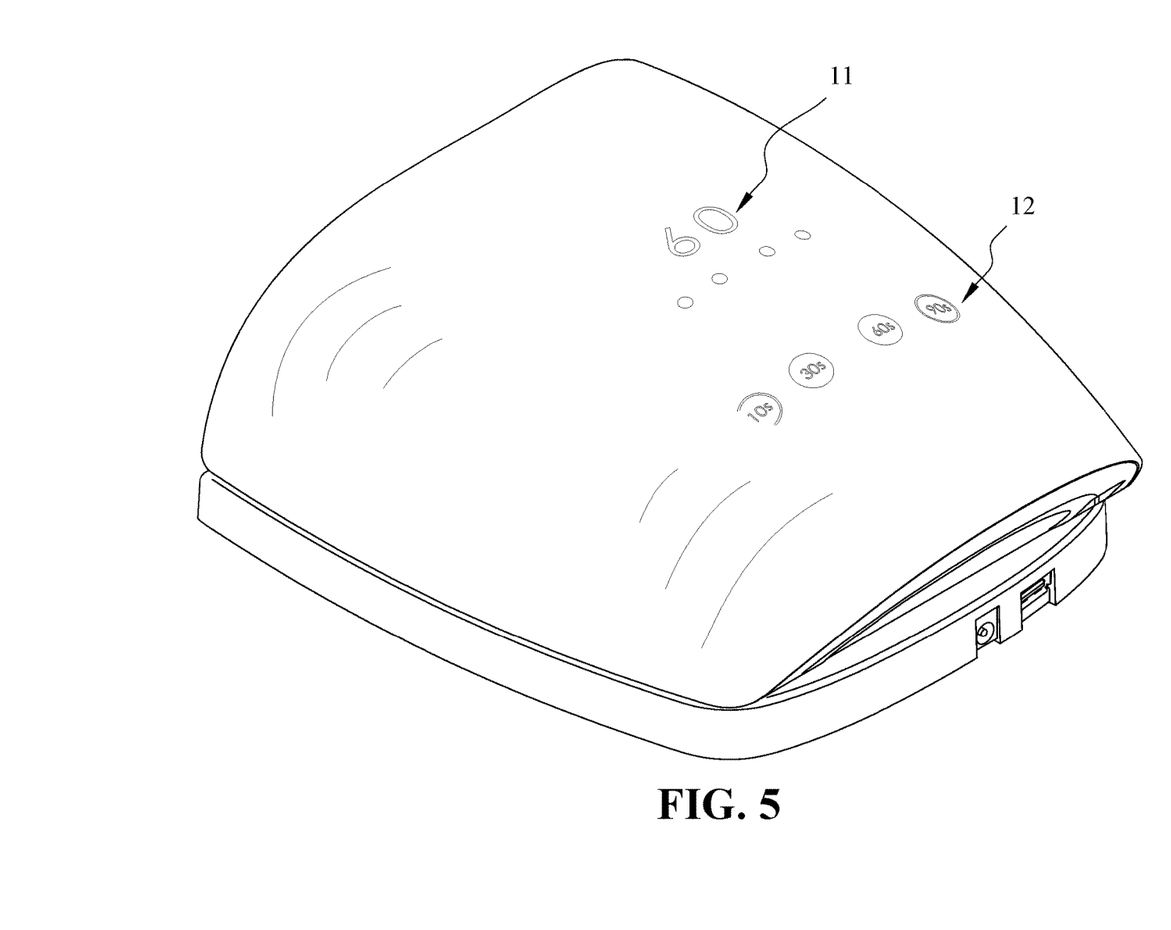
FIG. 5 is a schematic view showing a control module employed in the detachable beauty gel curing device in accordance with the preferred embodiment of the present invention.

FIG. 5 is a schematic view showing the control module in accordance with the preferred embodiment of the present invention. Referring to FIGS. 3 and 5, the control module includes the display screen 11 and the activating buttons 12. According to the preferred embodiment, there are four activating buttons 12, which has four different time setting modes; namely: 10 seconds, 30 seconds, 60 seconds and 90 seconds, respectively. In the fourth mode, the circuit for UV irradiation is preset in a way to ascend irradiation energy in a step-like manner. Ascend irradiation energy in a step-like manner means 30% of energy is emitted during the first 0-20 seconds, a half of energy is emitted during the 20-40 seconds, 70% of energy is emitted during the 40-60 seconds, and finally 100% of energy is emitted during the 60-90 seconds. It means that the light strength of the UV light emitted from the UV LED lamps of the UV LED modules 20 gradually ascends from weak to strong in the step-like manner. It is to note that the user can adjust the numbers of the actuation time and the activating buttons 12 in the time setting modes according to the needs. Alternatively, the activating buttons 12 can be adjusted allowing the user to set up the using time and using modes as he wishes. When the user selects one of the time setting modes through pressing the button labeled by number of seconds, the UV LED modules 20 will irradiate light in a specific wavelength to the fingernails or the toenails. Regarding the light in a specific wavelength, the UV LED modules 20 includes LED lamps to provide light in different wavelengths, such as a UV LED lamp capable of emitting the UV light with wavelength of 355-375 nm and another UV LED lamp capable of emitting the UV light with wavelength of 390-410 nm. The LED lamps with different wavelengths may provide different irradiation energy. Different products of the gel nail polish need different time to cure and therefore need different irradiation energy. For instance, the gel nail polish coated on the fingernails may have different thicknesses, which also need different time to cure. Thus, the beauty gel curing device according to the present invention is configured to provide different irradiation energy corresponding to the different numbers of seconds, whereby the user can optionally select the suitable time. Moreover, more than one time setting mode may be configured to be a mode having energy ascending in the step-like manner. That is, the LED lamps having different wavelengths provide the ascending irradiation energy in the step-like manner as time go by. Therefore, it can reduce the heat generated during the curing treatment. Generally speaking, the user would feel burn sensation without this configuration.

Referring to FIG. 1, the bottom seat 2 is formed with the USB port 5 allowing the user connecting the beauty gel curing device with external electric appliances, such as a manicure lamp having USB connector, a USB vacuum cleaner, a USB air filtering device and USB chargeable device, thereby enhancing and facilitating the utilization of the beauty gel curing device of the present invention. Moreover, the main body 1 is provided with a power supply port 10, which is a 12V plug for establishing electrical connection with external devices, such as 12V table lamp, 12V nail grinder, 12V vacuum cleaner and 12V air filtering device.

Referring to FIG. 1, the bottom seat 2 includes the pair of pins 14 having positive and negative terminals while the main body 1 has the pair of pin insert holes (not shown) for engaging with the pins 14 so as to establish electrical connection between the main body 1 and the bottom seat 2. When it needs to charge the main body 1, the pins 14 of the bottom seat 2 are aligned with and then inserted into the pin insert holes of the main body 1, thereby electrically connecting the main body 1 with the bottom seat 2. Moreover, the magnetic elements 16 of the main body 1 attract the magnets 15 at the bottom side of the lower bottom seat 22, thereby more securely connecting the main body 1 with the bottom seat 2. After the main body 1 and the bottom seat 2 are connected, the charging port 4 of the bottom seat 2 is electrically connected with an external power source, thereby supplying power to both of the main body 1 and the bottom seat 2 and charging the battery unit 19 installed within the main body 1. The magnets 15 and the magnetic elements 16 can reduce the impedance and further enhancing the stability of electric connection. After the charging operation of the battery unit 19, the main body 1 can be used separately or in combination with the bottom seat 2 depending on the requirement of the user.

FIG. 1 illustrates the main body 1 detachably mounted on the bottom seat 2 by means of gasket engagement effect. The main body 1 is connected with the bottom seat 2 by engaging the gasket pads 7 of the main body 1 with the pad retention recesses 9 of the bottom seat 2 in an interfering manner. The gasket pads 7 are made of elastic material, such as silicone, in order to provide detachable connection between the main body 1 and the bottom seat 2, and enhance the stability between the main body 1 and the bottom seat 2. Referring to FIGS. 1 and 4, the main body 1 includes the engaging hooks 6 to be fully engaged with the hook-reception recesses 8 of the bottom seat 2, such the engagement process, the main body 1 does not wobble relative to the bottom seat 2.

Referring again to FIGS. 1-4, according to the preferred embodiment of the present invention, the bottom of the main body 1 is formed with a pair of legs 23 adjacent to the opening while the bottom seat 2 has leg reception recesses 24 adjacent to the opening at positions corresponding to the legs 23. The legs 23 may be switched between a collapsed position and a supporting position. When the legs 23 are in the collapsed position, the legs 23 are collapsed and laid flat on the bottom of the main body 1, as shown in FIG. 1. When the legs 23 are in the supporting position, the legs 23 are flipped out and erectly standing in the leg reception recesses 24, thereby raising one end of the main body 1 upward relative to the bottom seat 2 by a distance. Therefore, the user can use the detachable beauty gel curing device according to the present invention in different positions to cure the gel nail polish on the nail.

FIG. 6 is a perspective view illustrating the detachable beauty gel curing device in accordance with the present invention in use. When it needs to disengage the main body 1 from the bottom seat 2, the user can simply grip the grip portion 3 without touching the opening at the other side of the main body 1. If taking the main body 1 from the opening at the other side, it is possible that the user's hand will touch the UV LED modules 20 and therefore damages or contaminates the UV LED modules 20. Moreover, since the battery unit can last for 1 to 1.5 hours, after detached from the bottom seat 2, the main body 1 can be carried along with the user, thereby facilitating in application of the beauty gel curing device of the present invention. Thus, the beauty gel curing device according to the present invention is easy to take and carry due to the grip portion 3. The grip portion 3 also can prevent the UV LED modules 20 from contamination.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A detachable beauty gel curing device comprising:
   a bottom seat;
   a main body detachably mounted on the bottom seat, the main body including:
      a base frame having a plurality of walls and an opening, the walls and the opening defining a chamber;
      a plurality of ultraviolet light emitting diode (UV LED) modules, each UV LED module including a plurality of UV LED lamps, wherein when the UV LED modules are activated, the UV LED lamps emits UV light beams into the chamber; and
      a top cover fixed on the base frame, the top cover and the base frame forming an external casing of the main body;
   a control module provided on the main body for controlling activation of the UV LED modules;
   a grip portion disposed at a side of the main body for holding the main body;
   a battery unit disposed in the main body; and
   a charging port disposed at a side of the bottom seat and capable of connecting with an external power source;
   wherein the bottom seat includes a pair of pins having positive and negative terminals while the main body includes a pair of pin insert holes corresponding to the pins, the main body is electrically connected with the bottom seat by the pins and the pin insert holes.

2. The beauty gel curing device according to claim 1, wherein a bottom of the main body includes a pair of engaging hooks and the bottom seat includes a pair of hook-reception recesses corresponding to the engaging hooks, the engaging hooks of the main body are engaged with the hook-reception recesses of the bottom seat, thereby detachably fixing the main body on the bottom seat.

3. The beauty gel curing device according to claim 1, wherein a plurality of magnets are provided in the bottom seat, the main body include a plurality of magnetic elements disposed at positions corresponding to the magnets, and the main body is connected with the bottom seat by the attraction between the magnets and the magnetic elements, thereby detachably fixing the main body on the bottom seat.

4. The beauty gel curing device according to claim 1, wherein a bottom of the main body includes a plurality of gasket pads, the bottom seat includes a plurality of pad retention recesses disposed at positions corresponding to the gasket pads, and the gasket pads of the main body are engaged with the pad retention recesses of the bottom seat, thereby detachably fixing the main body on the bottom seat.

5. The beauty gel curing device according to claim 1, wherein the control module includes a plurality of activating buttons, and the activating buttons are capable of activating different time setting modes, respectively.

6. The beauty gel curing device according to claim 1, wherein the control module includes a display screen capable of displaying countdown seconds.

7. The beauty gel curing device according to claim 1, wherein the bottom seat includes a universal serial bus (USB) port for electrically connecting an external device with the bottom seat.

8. The beauty gel curing device according to claim 1, wherein the main body includes a power supply port capable of electrically connecting with an external device.

9. The beauty gel curing device according to claim 1, wherein each UV LED module includes UV LED lamps to provide light in at least two different ranges of wavelengths.

10. The beauty gel curing device according to claim 1, wherein the bottom seat includes a digit positioning recess.

11. The beauty gel curing device according to claim 1, wherein a bottom of the main body includes at least one leg, the bottom seat includes at least one leg reception recess disposed at positions corresponding to the legs, the leg is capable of being switched between a collapsed position and a supporting position, the leg is laid flat on the bottom of the main body when the leg is in the collapsed position, the leg stands in the leg reception recess when the leg is in the supporting position, thereby raising one end of the main body upward to a position which has a distance from the bottom seat.

* * * * *